Figure 1:
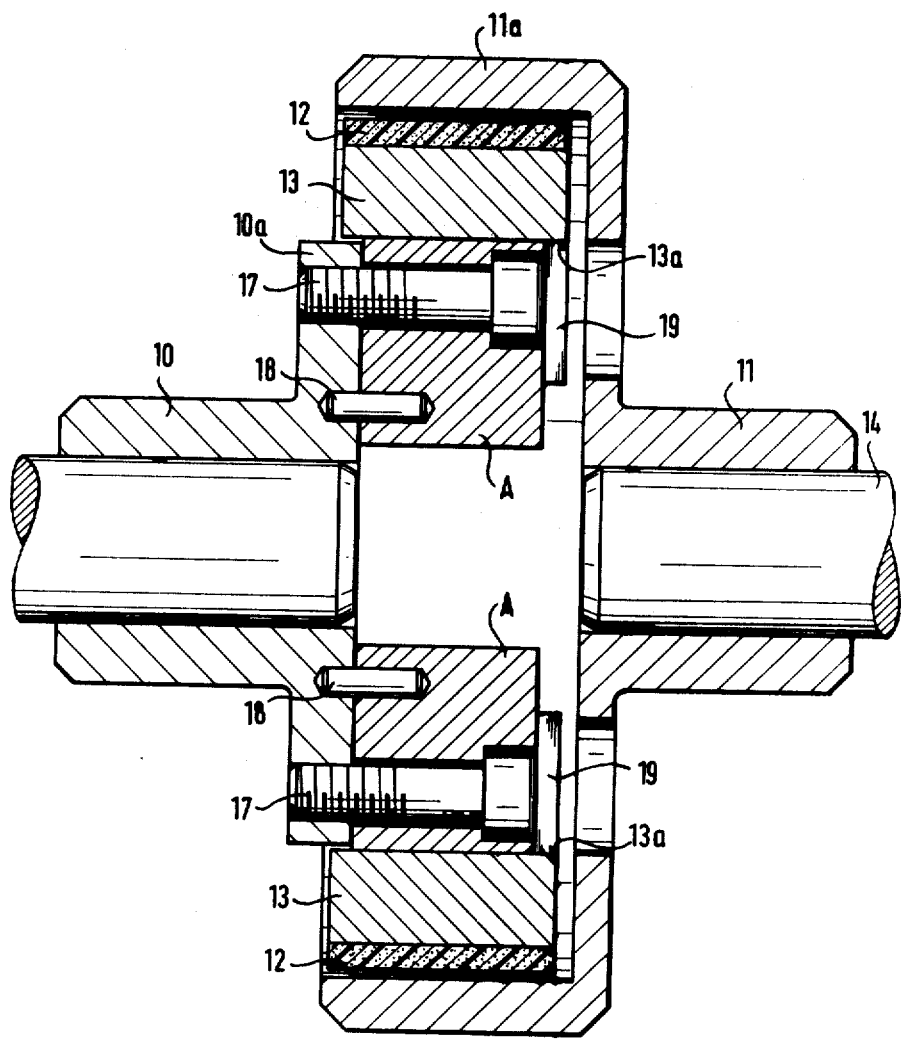

United States Patent
Kirschey

[15] 3,677,380
[45] July 18, 1972

[54] COUPLING OPERATING BY CENTRIFUGAL FORCE

[72] Inventor: Gerhard Kirschey, Ittertaler Strasse 52, 56 Wuppertal-Vohwinkel, Germany

[22] Filed: March 1, 1971

[21] Appl. No.: 119,534

[30] Foreign Application Priority Data

March 2, 1970 Germany..................P 20 09 607.5

[52] U.S. Cl....................................192/105 BA, 192/103 B
[51] Int. Cl..........................................................F16d 23/10
[58] Field of Search..................192/105 BA, 105 CD, 103 B; 188/185

[56] References Cited

UNITED STATES PATENTS

| | | | |
|---|---|---|---|
| 2,283,325 | 5/1942 | Fawick | 192/105 BA |
| 2,340,415 | 2/1944 | Eason | 192/105 BA |
| 2,367,048 | 1/1945 | Pentz | 192/105 BA |
| 2,626,033 | 1/1953 | Lewis et al. | 192/105 BA |
| 2,852,117 | 9/1958 | Sproul | 192/105 BA |

FOREIGN PATENTS OR APPLICATIONS

| | | | |
|---|---|---|---|
| 611,190 | 4/1946 | Great Britain | 192/105 BA |

*Primary Examiner*—Benjamin W. Wyche
*Assistant Examiner*—Randall Heald
*Attorney*—Ernest G. Montague

[57] ABSTRACT

A centrifugal clutch which comprises an elastic coupling element connected with the driving side of the clutch. Centrifuge bodies carry a layer on the outside and cooperate with the driven side of the clutch. The coupling element comprises coupling-cushion structural units. Each of the coupling-cushion structural units includes two equal coupling cushions, pretensioned in longitudinal direction under pressure against each other, upset in the longitudinal axis, extending substantially in secantial planes and disposed at an angle toward each other. The units are connected at their sides pointing toward each other with a coupling-cushion connector formed as a driving stay connected with the driving side of the clutch. A centrifuge body segment engages the coupling-cushion structural-unit on the outside curve-like surrounding on the opposite ends of the coupling cushions. The centrifuge body segment engages the driving stay with the coupling cushion structural unit formed as a pretensioned coupling-built-in-segment by abutment of the inner side of the centrifuge-body segment pointing toward the coupling-cushion structural unit, thereby shot-cutting all pretension forces.

12 Claims, 4 Drawing Figures

Patented July 18, 1972

3,677,380

4 Sheets-Sheet 1

INVENTOR
GERHARD KIRSCHEY

BY: Ernest G. Montague
Attorney

COUPLING OPERATING BY CENTRIFUGAL FORCE

The present invention relates to a centrifuge clutch with an elastic coupling element, which on the one hand is connected on the driving side of the clutch and on which on the other hand a centrifuge body carrying a coupling layer on the outer side cooperates with the driven side of the clutch.

Centrifugal clutches of the above described type are known. The elastic coupling elements inserted in such previously known clutches comprise rubberrings, closed around in peripheral direction, as they appear in the disclosure of the German Pat. Specification No. 945,199. These rubber-coupling rings are connected on the one side with a clutch drive, while on the other side they engage centrifuge bodies which cooperate with the driven side of the clutch.

Coupling elements of the previously known type are subjected to driving forces effective in peripheral direction from the engagement location of the driving side of the clutch on the one hand, and on the other side of the engagement location appreciable pulling forces. It is now in the nature of the matter, that coupling bodies consisting of rubber sustain much better and in much greater extent pressure forces while they, however, react sensitively to pulling forces. If it is finally taken into consideration, that from these peripheral forces also a radial force component is effected by the engagement of the centrifuge body, it is obvious that such coupling elements are subjected to extreme loads. With the consideration of these points, one is also desirous in the practice to maintain as small as possible the undesirable pulling forces.

Starting with this finding, it is one object of the present invention to provide a centrifugal clutch, wherein the coupling elements are improved in an advantageous manner.

It is another object of the present invention to provide a centrifugal clutch, wherein the coupling element comprises coupling-cushion structural units, whereby, however, each individual coupling-cushion structural unit consists of two coupling cushions preferably equally formed relative to each other, which are in longitudinal direction under pressure to each other and pretensioned, that means set-up in the longitudinal axis and extending at an angle to each other and with the units substantially in secantial planes, which coupling cushions are connected at their sides pointing towards each other on a drive stay connected with the driving side of the clutch is a coupling cushion connected, while on the remote end of the coupling cushion a centrifuge body segment engages on the outside curve-like surrounding the coupling-cushion structural units, which centrifuge body segment by abutment of its inside pointed to the coupling-cushion structural unit outside on the drive stay engages a coupling-cushion structural unit formed as a pretensioned coupling built in segment and thereby short circuits all pretension forces.

If one starts with the premise, that in case of coupling elements consisting of rubber are more friendly inclined to the pressure forces effecting the same as compared with pulling loads, it has been obtained by the present invention by the pretensioned coupling cushions in their longitudinal axis under pressure, to provide a solution, which comes close to an ideal solution concerning the capability of loading such coupling cushions. Due to the fact that both coupling cushions constituting a coupling cushion structural unit are pretensioned, the pulling forces experienced here also cannot be of a disadvantage on the coupling cushion with the occurring peripheral forces, because by the created pulling forces at first the measure of the pressure pretension must be in the cushion subjected to pull.

In addition to this advantage of the subject matter of the present invention, a further advantage is seen also in the fact that the coupling now with appreciably smaller structure can be loaded appreciably higher, which is of decisive importance for the practice in particular for the provision of such couplings.

Also it is within the framework of the present invention of further decisive forces, that the centrifuge bodies equipped with a coupling layer engage the coupling cushion on the driving and coupling side, respectively, of the coupling element with the remote ends of the pretensioned coupling cushions with the driving side. By the practiced pretensions of the coupling cushions in the longitudinal axis in the present invention results namely a longitudinal force, a radial component of which pulls radially inwardly and also holds tight the centrifuge bodies so that a pretension coupling cushion thus causes a further function in the sense of holding of the centrifuged body. By this arrangement until now conventional returned holding-springs for the centrifuge bodies can be omitted.

A further importance gains the present invention by the fact, that each coupling cushion-structural unit, proposed in accordance with the present invention is formed as a pretensioned coupling built-in segment, so that each coupling cushion structural unit constitutes an operation-ready assembly unit, in which the centrifuged bodies engage both coupling cushion connectors formed as a driving stay and holding together in the center and thereby within structural unit short circuits the radially inwardly operating component of the pretension force = return with holding force.

In this connection it should be pointed out also that by the proposed structure with the use of pretensioned coupling cushions, the latter have as to their strength a preselected pretension, by the radial switch coupling movement, which is created by the radial movement of the centrifuge bodies, still additionally is increased and is not reduced, what effects the loads effecting the cushions operates to the favorable side.

Concerning the constructive arrangement of the new centrifuge force coupling it is suitable if the driving stay in the center between both coupling cushions constituting a coupling cushion-structural unit is vulcanized to the ends of the coupling cushions pointing towards each other, as on the other ends of the coupling cushions arranged centrifuge, securing holders.

Also an assembly help of the coupling built-in segment is obtained such, that the substantially triangular driving stay is equipped outside of its connecting bolt coupling with the driving side of the coupling is equipped with an assembly position fixing with an arresting pin effecting an assembly position fixing. By this arrangement namely the entire segment can be fixed at first and then be exactly aligned, prior to preforming the final screwing with the driving side of the coupling.

It is seen from the constructive side also of advantage, if the coupling bolt is arranged outside of the section point of the longitudinal center axis of the coupling cushions that means outside of the center, at about at and near, respectively, at the outer edge of the driving stay. In this manner the single securing screw can be provided at a point of the triangular driving stay, where also sufficient room is provided without weakening the driving stay in any manner.

Each centrifuge body segment can be connected with the securing holders vulcanized to the ends of the coupling cushions either by means of cross connecting members or also without providing any particular member for connecting, by example, by welding or the like.

For the formation of a joint coupling element a plurality of coupling cushion structural units of the invention can be concentrically be aligned about the longitudinal center axis of the coupling.

A further point is of decisive importance for the present invention, as the switching point of the coupling can be preselected with the simplest means. This switching point is, by example, influenced by the measure of a coupling cushion pretension, and respectively, by the shore hardness of the elastic rubber cushions.

A further possibility resides also in the fact to influence the switching point either by the self weight of the centrifuged bodies themselves or by the angle between both coupling cushions longitudinal axes.

In this connection attention is also directed, that it is obvious to choose an asymmetric arrangement in addition to the symmetric arrangement of a coupling cushion structural unit, as it is proposed by the present invention, in which an asymmetric arrangement by example as to size and/or pretension force different coupling cushions can be used.

And last but not least, in the practice of the present invention can an advantageous further embodiment find its base, that the two coupling cushions of the coupling cushion structural unit are united to a single integral pretensioned in longitudinal direction, that means in a longitudinal axis upset individual coupling cushion, which on its side pointing towards the centrifuged body segment is connected with the coupling drive, and in which furthermore the centrifuged body segment engages on the side of the coupling cushion remote to the latter and by abutment of its inner side pointed towards the cushion on the outside of the cushion pointing towards the centrifuged body segment is short circuited with the latter, as well as preferably forms a pretension assembly structural unit.

It is also pointed out, that the coupling cushion structural units arranged as pretensioned assembly structural units possibly can be designed also as such, that the pretension is only applied during the assembly, if this should be suitable in some special structure type of the coupling.

In summary it is by all means obtained by the present invention in a centrifuge force clutch to arrange the elastic coupling element or coupling elements such, that they are no more endangered to be subjected to pull, rather in a direction not influencing to a disadvantage, namely, are charged to a pressure load. On the other hand, these coupling elements fulfill a pretension pressure cushion by the engagement of the centrifuged body segment which is characteristical for the present invention, a holding function effective on the latter in non-operational state of the coupling. This new coupling is characterized by a compact structure and by higher capability of being loaded and complies thereby with the highest requirements, whereby it offers itself in the practice as a technical superior developed solution, which comes close to the ideal solution about the capability of loading coupling elements.

Figure 2:
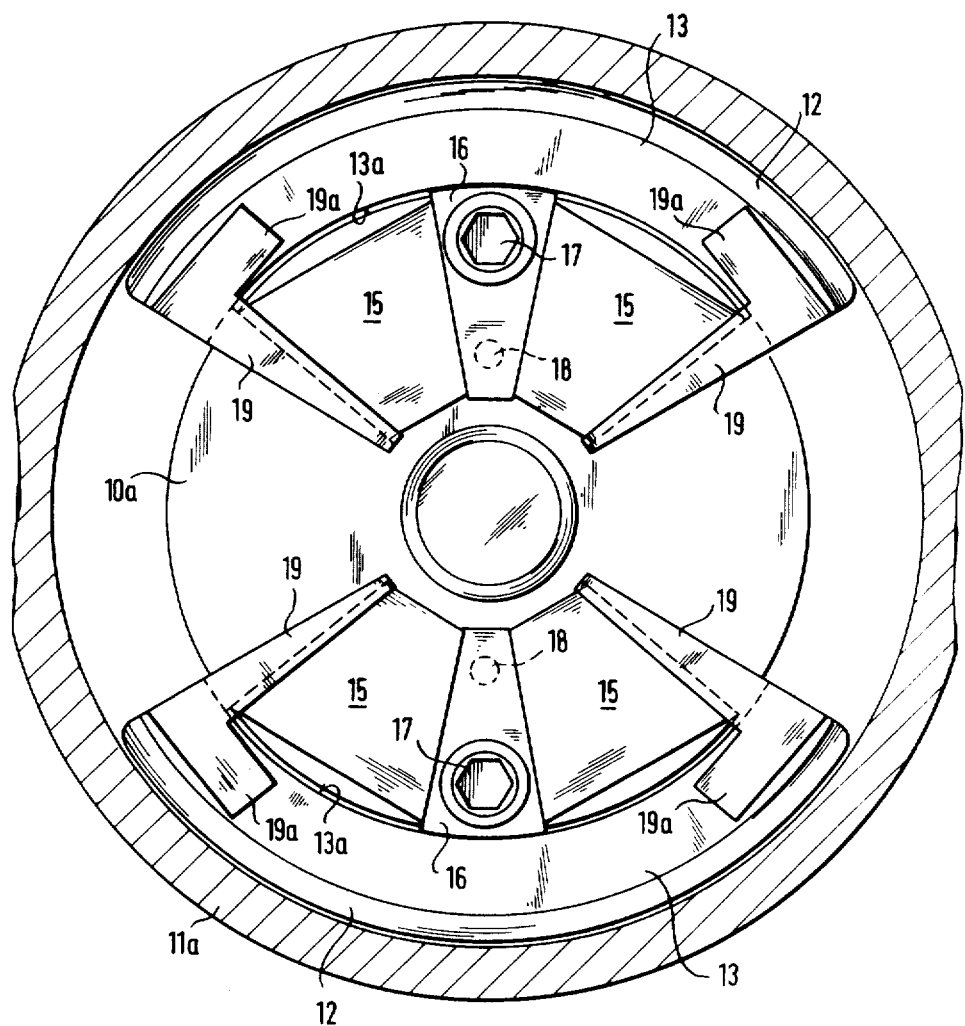
Figure 3:
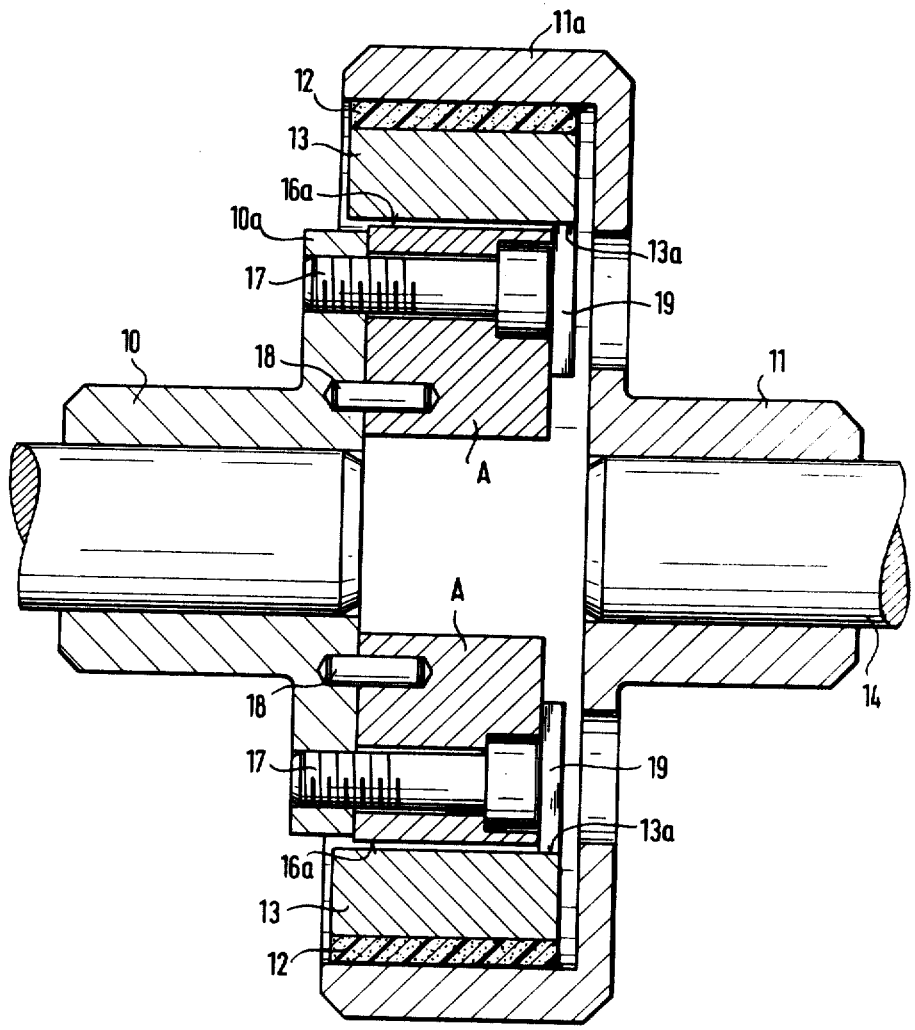
Figure 4:
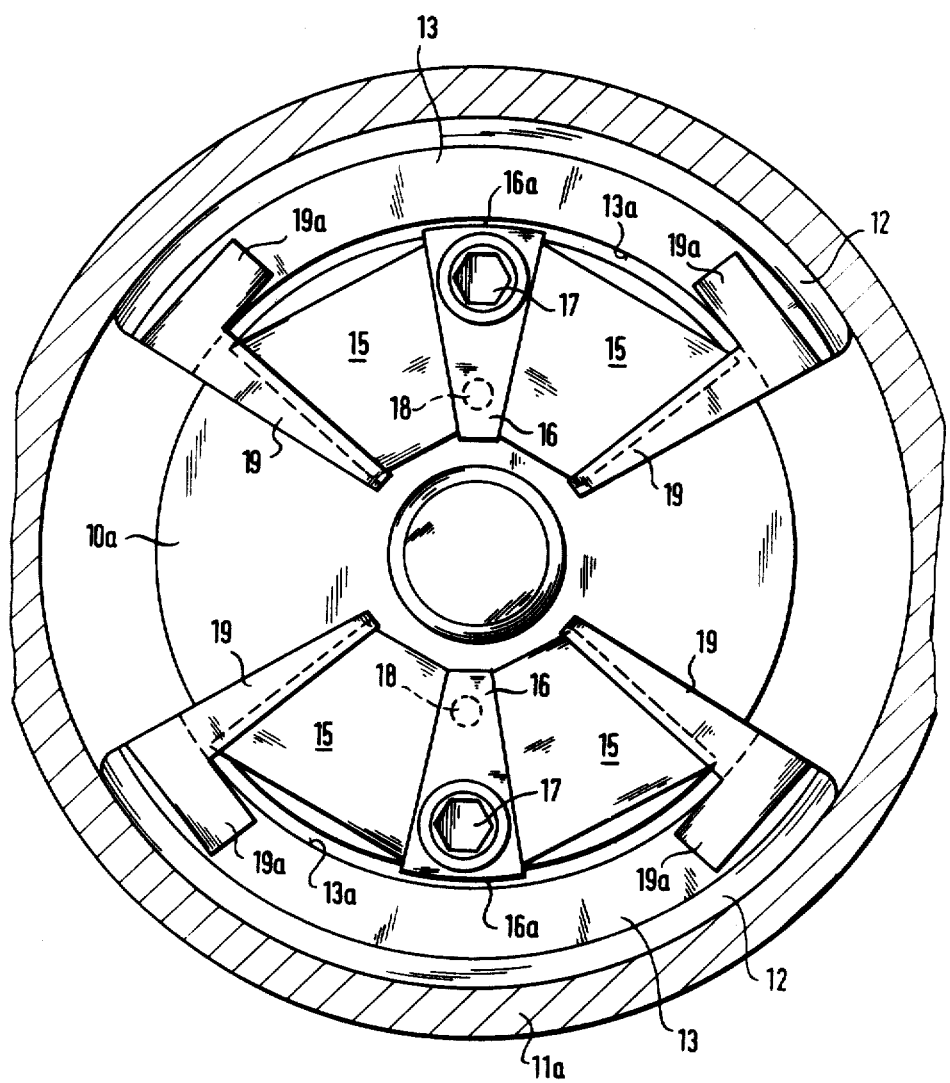

With these and other objects in view which will become apparent in the following detailed description, the present invention will be clearly understood in connection with the accompanying drawings, in which:

FIG. 1 is an axial section of a centrifuge force clutch;
FIG. 2 is a cross section of a clutch; likewise in its resting position;
FIG. 3 is an axial section similar to that of FIG. 1 of the clutch in its operating state; and
FIG. 4 is a cross section of the clutch with the coupling parts in the joining state.

Referring now to the drawings a clutch is disclosed having a driving side 10 and a driven side 11. The driving side 10 of the coupling is connected with a coupling element A, on which in turn a centrifuged body 13 engages equipped with a coupling layer 12. With its coupling layer 12 the centrifuge body 13 cooperates with a bell 11a of the driven side 11 of the clutch in the sense of a rotary joining and drives thereby the driven shaft 14.

In accordance with the present invention coupling cushion structural units are inserted as a coupling element A, in which two coupling cushions 15 equal as to each other, pretensioned in the longitudinal axis under pressure and pretensioned fixed against pressure on their sides pointing towards each other are connected with a coupling connector 16 by vulcanization, which coupling connector 16 in turn has about triangular shape, has a securing bolt 17, which is connected by means of a radial flange 10a of the driving side 10 of said clutch and has outside of the coupling bolt 17 a fixing pin 18, which serves as arrest for the assembly.

On the ends of each of the coupling cushions 15 are vulcanized securing holders 19, which have angularly shaped design and are connected with their arm parts 19a with segment shaped centrifuged bodies 13. Each centrifuge body 13 is in its resting state of the clutch supported with its inner side 13a on the outer side 16a of the driving stay 16. Preferably each coupling cushion structural unit is formed as a pretensioned assembly unit. A plurality of such coupling cushion structural units form together a coupling element.

The operation of this new centrifuge force clutch is to be understood such, that starting with the resting state in accordance with FIGS. 1 and 2, by means of a driving part 10 of the clutch, the coupling cushion structural units brought into rotation with structural units are driven by the peripheral forces exerted thereon. In the rotating coupling element a radial force component is then built up by the centrifugal force of the centrifuge body. At first the radially inwardly directed component of the pretension force of the pressure cushions, the centrifuge bodies 13 are held tight and press the same against the driving stay 16. Only upon reaching a previously determined switching on number, becomes the outwardly effective centrifugal force stronger, than the radially inwardly effective pretension force, lift the centrifuge bodies 13 from the driving stay 16, move radially outwardly, where by the coupling layer 12 engages the bell 11a and joins the latter. In this radial movement of the centrifuged bodies 13 outwardly, the cushions are still further upset, so that thereby the pretensions in the coupling cushion 15 are still increased. Upon removal of the radial force component, that means in the resting state of the clutch, the pretension force is effected in the coupling cushions in the direction of a radial return of the centrifuge bodies and holds the same upon abutment on the driving stay.

It is to be understood that the shown and described embodiment is to be seen only for the practical realization of the present invention, that, however, under no circumstances is it limited thereto. One could rather, as already mentioned before, design the coupling cushion structural units also in a deviating manner. Under circumstances also an arrangement is possible of the individual coupling cushion in a radial plane.

While I have disclosed one embodiment of the present invention it is to be understood that this embodiment is given by example only and not in a limiting sense.

I claim:

1. A centrifugal clutch, comprising
an elastic coupling element connected with the driving side of said clutch,
centrifuge bodies carrying a layer on the outside and cooperating with the driven side of said clutch,
said coupling element comprising coupling-cushion structural units,
each of said coupling-cushion structural units includes two equal coupling cushions, pretensioned in longitudinal direction under pressure against each other, upset in the longitudinal axis, extending substantially in secantial planes and disposed at an angle toward each other,
said units being connected at their sides pointing toward each other with a coupling-cushion connector formed as a driving stay connected with the driving side of the clutch,
a centrifuge body segment engaging said coupling-cushion structural-unit on the outside curve-like surrounding on the opposite ends of said coupling cushions,
said centrifuge body segment engaging said driving stay with said coupling cushion structural unit formed as a pretensioned coupling-built-in-segment by abutment of the inner side of said centrifuge-body segment pointing toward said coupling-cushion structural unit, thereby short-cutting all pretension forces.

2. The centrifugal clutch, as set forth in claim 1, wherein said driving stay is vulcanized to the ends of said coupling cushions pointing toward said driving stay in the center between said coupling-cushions constituting a coupling-cushion structural unit, and
the opposite ends of said coupling-cushions are vulcanized to centrifuge-body-securing holders.

3. The centrifugal clutch, as set forth in claim 1, wherein said driving stay is substantially triangular shape and includes in addition to a connecting bolt coupling the driving side of said clutch with said driving stay also an arresting pin causing a position fixing.

4. The centrifugal clutch, as set forth in claims 3, wherein
said coupling bolt is disposed outside of the cutting point of the longitudinal central axes of said coupling-cushions substantially close to said driving stay.

5. The centrifugal clutch, as set forth in claim 2, wherein
said centrifuge-body-securing-holders comprise angular holders having at least two arms,
one of said arms is vulcanized to said coupling cushion, and the other of said arms is connected with said centrifuge body.

6. The centrifugal clutch, as set forth in claim 1, wherein
a plurality of said coupling cushion structural units are disposed concentrically about the coupling longitudinal central axis of said clutch to constitute a joint clutch element.

7. The centrifugal clutch, as set forth in claim 1, wherein
the switching point of said clutch is dependent upon the degree of pretension of said coupling-cushions.

8. The centrifugal clutch, as set forth in claim 1, wherein
the switching point of said clutch is dependent upon the shore hardness of elastic rubber cushions.

9. The centrifugal clutch, as set forth in claim 1, wherein
the switching point of said clutch is dependent upon the weight of said centrifuge bodies.

10. The centrifuge clutch, as set forth in claim 1, wherein
the switching point is dependent upon the angle between the longitudinal axes of both of said coupling cushions of said coupling-cushion structural unit.

11. The centrifugal force, as set forth in claim 1, wherein
two individual coupling-cushions different in size and pretension are joined to an asymmetric coupling-cushion-structural unit.

12. The centrifugal force, as set forth in claim 1, wherein
both of said coupling-cushions of said coupling-cushion-structural unit are joined to a single, integral individual coupling-cushion, pretensioned in the longitudinal direction and upset in the longitudinal axis,
said individual coupling-cushion is connected with the driving side of said clutch on its side directed toward said centrifuge body segment,
the latter engaging the remote side of said coupling-cushion, and by abutment of its inner side pointing toward said cushion is shortcircuited with said cushion on the outer side of said cushion pointing toward said centrifuge body segment, and constitutes a pretensioned assembly structural unit.

* * * * *